(12) United States Patent
Naito

(10) Patent No.: US 12,136,076 B2
(45) Date of Patent: Nov. 5, 2024

(54) PAYMENT DEVICE

(71) Applicant: TOSHIBA TEC KABUSHIKI KAISHA, Tokyo (JP)

(72) Inventor: Hidehiro Naito, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 110 days.

(21) Appl. No.: 17/882,235

(22) Filed: Aug. 5, 2022

(65) Prior Publication Data

US 2022/0374858 A1 Nov. 24, 2022

Related U.S. Application Data

(63) Continuation of application No. PCT/JP2021/029547, filed on Aug. 10, 2021.

(30) Foreign Application Priority Data

Aug. 21, 2020 (JP) .................................. 2020-139881

(51) Int. Cl.
*G06Q 20/20* (2012.01)

(52) U.S. Cl.
CPC .................................. *G06Q 20/208* (2013.01)

(58) Field of Classification Search
CPC .. G06Q 20/208; G07G 1/0045; G07G 1/0018; G06K 7/10; G06K 7/14;

(Continued)

(56) References Cited

U.S. PATENT DOCUMENTS 6,299,065 B1 * 10/2001 Knowles .............. G06K 7/0166
235/436
8,356,749 B2 * 1/2013 Olmstead ........... G06K 7/10861
235/440

(Continued)

FOREIGN PATENT DOCUMENTS

EP 3425578 A1 1/2019
JP H04-357585 A 12/1992

(Continued)

OTHER PUBLICATIONS

Youssef, Sherin M., and Rana M. Salem. "Automated barcode recognition for smart identification and inspection automation." Expert Systems with Applications 33.4 (2007): 968-977. (Year: 2007).*

(Continued)

*Primary Examiner* — Nathan A Mitchell

(74) *Attorney, Agent, or Firm* — Kim & Stewart LLP

(57) ABSTRACT

A payment device of an embodiment includes a first reading unit and a second reading unit each of which reads a symbol attached to a product; a notification part; and a controller, wherein the controller determines whether the first reading unit has read a symbol within a predetermined time when the second reading unit reads a symbol attached to the product, the controller causes the notification part to issue a notification that a symbol has been read when the first reading unit (Continued)

has read the symbol, and the controller causes the notification part to issue a notification that the symbol has been read after a lapse of the predetermined time when the first reading unit has not read the symbol within the predetermined time.

4 Claims, 11 Drawing Sheets

(58) Field of Classification Search
CPC .... G06K 7/10821; G06K 7/1413; G08B 3/10; G08B 5/36
See application file for complete search history.

(56) References Cited

U.S. PATENT DOCUMENTS

| | | | |
|---|---|---|---|
| 8,825,531 B1 | 9/2014 | Catoe | |
| 2004/0086182 A1* | 5/2004 | Bian | G06K 7/10861 382/183 |
| 2008/0027817 A1 | 1/2008 | Iizaka et al. | |
| 2010/0059589 A1 | 3/2010 | Goncalves et al. | |
| 2010/0252635 A1 | 10/2010 | Drzymala et al. | |
| 2011/0218870 A1* | 9/2011 | Shams | G06Q 20/208 235/383 |
| 2012/0160917 A1* | 6/2012 | Barkan | G06K 7/1096 235/440 |
| 2013/0135101 A1* | 5/2013 | Kotula | G05B 19/41815 340/540 |
| 2014/0001266 A1* | 1/2014 | Collins, Jr. | G06K 7/10861 235/462.13 |
| 2016/0351023 A1 | 12/2016 | Takeno et al. | |
| 2019/0012883 A1* | 1/2019 | Takeno | G07G 1/009 |
| 2021/0304175 A1* | 9/2021 | Yamashita | G07G 1/0045 |
| 2022/0051531 A1* | 2/2022 | Naito | G07G 1/0054 |

FOREIGN PATENT DOCUMENTS

| | | |
|---|---|---|
| JP | H09-91367 A | 4/1997 |
| JP | H11-7489 A | 1/1999 |
| JP | 2001-167224 A | 6/2001 |
| JP | 2005-141648 A | 6/2005 |
| JP | 2005-301720 A | 10/2005 |
| JP | 2007-264918 A | 10/2007 |
| JP | 2012-048742 A | 3/2012 |
| JP | 2013-121134 A | 6/2013 |
| JP | 2016-151921 A | 8/2016 |
| JP | 2017-224364 A | 12/2017 |

OTHER PUBLICATIONS

English Translation of International Search Report dated Feb. 24, 2022, mailed in counterpart International Application No. PCT/JP2021/029547, 2 pages.
Examination Report mailed Jul. 11, 2023, in corresponding Indian Patent Application No. 202247045264, 7 pages.
Decision to Grant a Patent mailed Jun. 4, 2024 in corresponding Japanese Patent Application No. 2020-139881, 3 pages (with Translation).
Extended European Search Report mailed Jun. 26, 2024 in corresponding European Patent Application No. 21858217.9, 8 pages.
Request for the Submission of an Opinion (Office Action) mailed Jul. 12, 2024 in Korean Patent Application No. 10-2022-7026687 with English machine translation, 9 pages.

* cited by examiner

PAYMENT DEVICE

CROSS-REFERENCE TO RELATED APPLICATIONS

This application is a continuation application of International Application No. PCT/JP2021/029547, filed Aug. 10, 2021, which designates the United States, and which claims the benefit of priority from Japanese Patent Application No. 2020-139881, filed Aug. 21, 2020, the entire contents of which are incorporated herein by reference.

FIELD

Embodiments described herein relate generally to a payment device.

BACKGROUND

In recent years, in stores such as supermarkets and convenience stores, a self checkout device in which a customer who purchases a product performs a product registration operation and a payment operation is used.

Such a self checkout device includes a payment device in which a customer performs a registration operation or a payment operation (that is, the operator is the customer). When a product registration operation is performed in the payment device, a symbol such as a barcode attached to the product is imaged by an imaging unit including a camera provided in a reading unit provided in the payment device. However, since a customer who is not used to the registration operation performs the registration operation, the symbol may not be firmly directed to the reading unit. Therefore, when the customer performs the registration operation, the accuracy of causing the reading unit to image the symbol may be deteriorated. For this reason, recent payment devices include a plurality of reading units, and can image a symbol by any of the reading unit without directing the symbol to a specific reading unit. Then, when any of the reading units correctly images the symbol, an output is performed to notify the customer that the symbol has been imaged by, for example, voice, light, display, and the like.

In such a payment device, even when a reading unit other than a specific reading unit to which a customer intends to direct a symbol reads the symbol before the specific reading unit, notification indicating that the reading unit has read the symbol is performed. However, the customer is still performing the operation of directing the symbol to the specific imaging unit, and the customer may be confused when there is an unexpected notification in the middle of the operation.

Note that such a problem has occurred not only in a payment device in a self checkout device but also in a payment device in a normal checkout device in which the operator of a store is a clerk.

It is thus preferable to provide a payment device that prevents an operator from being confused by notification when a symbol is imaged.

DETAILED DESCRIPTION

According to one embodiment, a payment device includes a first reading unit and a second reading unit each of which reads a symbol attached to a product; a notification part; and a controller, wherein the controller determines whether the first reading unit has read a symbol within a predetermined time when the second reading unit reads a symbol attached to the product, the controller causes the notification part to issue a notification that a symbol has been read when the first reading unit has read the symbol, and the controller causes the notification part to issue a notification that the symbol has been read after a lapse of the predetermined time when the first reading unit has not read the symbol within the predetermined time.

Hereinafter, embodiments (a first embodiment and a second embodiment) will be described with reference to the drawings. In the embodiments, a payment device provided in a self checkout device in which a customer performs a product registration operation and a payment operation will be described as an example. In the embodiment, it is assumed that the number of second reading units is one. Note that the present invention is not limited by the embodiments described below. In the following description, FIGS. 1, 2, and 6 will be described as the first embodiment, but the second embodiment has the same configuration.

First Embodiment

Figure 1:
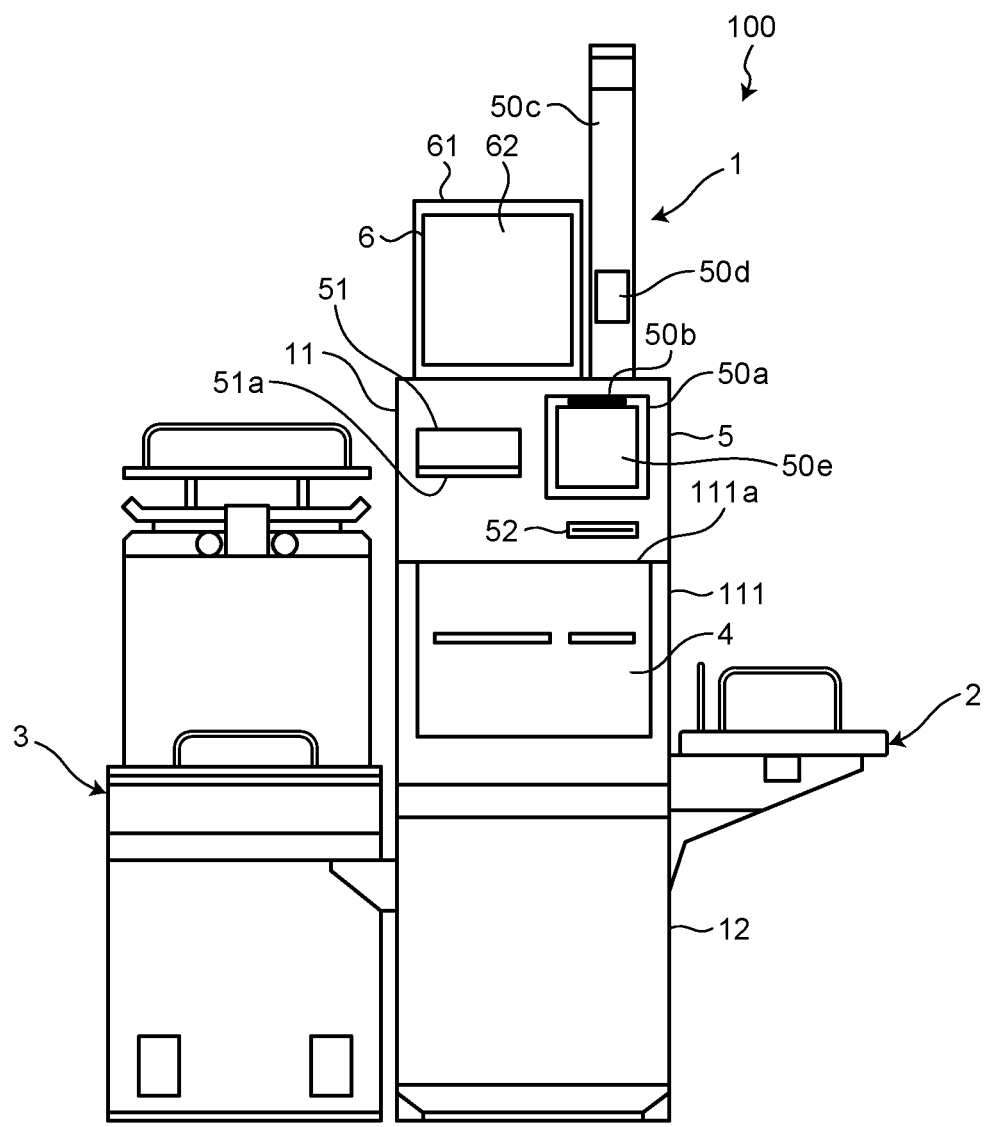
FIG. 1 is a front view illustrating an appearance of a checkout device according to an embodiment.

FIG. 1 is a front view illustrating an appearance of a self checkout device 100 according to the first embodiment. As illustrated in FIG. 1, the self checkout device 100 includes a payment device 1, a basket placement shelf 2, and a bagging shelf 3. The payment device 1 includes a reading unit 5 and a control unit 300 (see FIG. 3) that controls each unit. Note that the payment device 1 according to the embodiment further includes a money receiving and dispensing unit 4 and a display operation unit 6, but these are not essential requirements.

The payment device 1 includes a first housing 11 and a second housing 12. The first housing 11 includes a door 111 that can be opened and closed. The door 111 rotates in the vertical direction about a hinge portion 111a. The first housing 11 houses, in its inside, a bill receiving and dispensing machine and a coin receiving and dispensing machine (both not illustrated) constituting the money receiving and dispensing unit 4. The second housing 12 houses the control unit 300 inside. In addition, the payment device 1 includes a columnar pole 50c erected upward from the reading unit 5.

The reading unit 5 includes a first reading unit 50a and a second reading unit 50d that image an appearance of a product or a symbol such as a barcode or a two-dimensional code attached to the product in order to specify the product.

The first reading unit 50a includes a reading window 50e in front of the reading unit 5, and the reading window 50e is installed for a customer who operates the payment device 1. The first reading unit 50a incorporates a camera 50f (see FIG. 2) that images a symbol.

In addition, the first reading unit 50a includes a light emitting unit 50b including an LED or the like disposed in the lateral direction as an example at a position near the upper portion of the first reading unit 50a. The light emitting unit 50b irradiates the product imaged by the first reading unit 50a with light. The light emitted from the light emitting unit 50b irradiates the product. The light reflected by the product enters the camera 50f, in a manner that the first reading unit 50a images the product. The light emitting unit 50b emits light to cause the customer to recognize the position of first reading unit 50a and to be aware of directing the symbol to first reading unit 50a.

The second reading unit 50d is installed or embedded in the pole 50c. The second reading unit 50d incorporates a camera 50g (see FIG. 2) that images a symbol. The second reading unit 50d is disposed above the first reading unit 50a, the camera 50g is installed obliquely downward from above, and the second reading unit 50d images a symbol attached to a product located obliquely downward. The light emitting unit 50b emits light toward a product. The light emitted from the light emitting unit 50b irradiates the product. The light reflected by the product enters the camera 50g, in a manner that the second reading unit 50d images the product.

The second reading unit 50d is configured to be less conspicuous than the first reading unit 50a. For example, the second reading unit 50d does not include a light source such as the light emitting unit 50b. The second reading unit 50d may be embedded in the pole 50c to make the appearance of the second reading unit 50d inconspicuous. In addition, the second reading unit 50d may be integrated with the pole 50c to make the appearance of the second reading unit 50d inconspicuous. In addition, the second reading unit 50d may face a reading window (not illustrated) obliquely downward not to enter the eyes of the customer who is the operator, and the appearance of the second reading unit 50d may be made inconspicuous. The customer performs the product registration operation without being aware of the second reading unit 50d.

Here, the product registration operation means that a customer holds a symbol attached to a product over the reading unit 5 and causes the reading unit 5 to capture (that is, read) the symbol. In addition, the payment operation is an operation for the payment device 1 to perform payment processing on the product having the symbol read by the reading unit 5.

In addition, the reading unit 5 includes a printer 51 that prints a receipt related to the product sales data processing executed by the control unit 300. In the printer 51, a receipt discharge table 51a that supports the ejected receipt protrudes from the first housing 11. That is, the receipt discharge table 51a is a convex portion having a convex shape provided to protrude from the first housing 11. Further, the reading unit 5 includes a card reader 52 that reads a credit card related to the payment processing executed by the control unit 300.

The display operation unit 6 includes a monitor 61 and a touch panel 62. The monitor 61 displays characters and images under the control of the control unit 300. The touch panel 62 is provided on a surface of the monitor 61, and outputs information based on a position operated by an operator (customer) to the control unit 300.

The basket placement shelf 2 is a storage stand on which a basket storing a product to be purchased at the time of performing a registration operation is placed. The basket placement shelf 2 is provided on one side of the payment device 1.

The bagging shelf 3 is a table for bagging the product for which the registration operation has been performed. The bagging shelf 3 is provided on the other side of the payment device 1 (the side opposite to the basket placement shelf 2).

The payment device 1 displays, on the monitor 61, the product information (product name, product price, etc.) of the product to which the symbol imaged by the registration operation is attached, and executes registration processing of storing the product information. In addition, when the payment operation is performed, the payment device 1 performs a payment processing of displaying the total amount on the monitor 61 for the product subjected to the registration processing, paying out the change from the money receiving and dispensing unit 4 when there is change, and issuing a receipt on which the product information and the payment information are printed from the printer 51.

Figure 2:
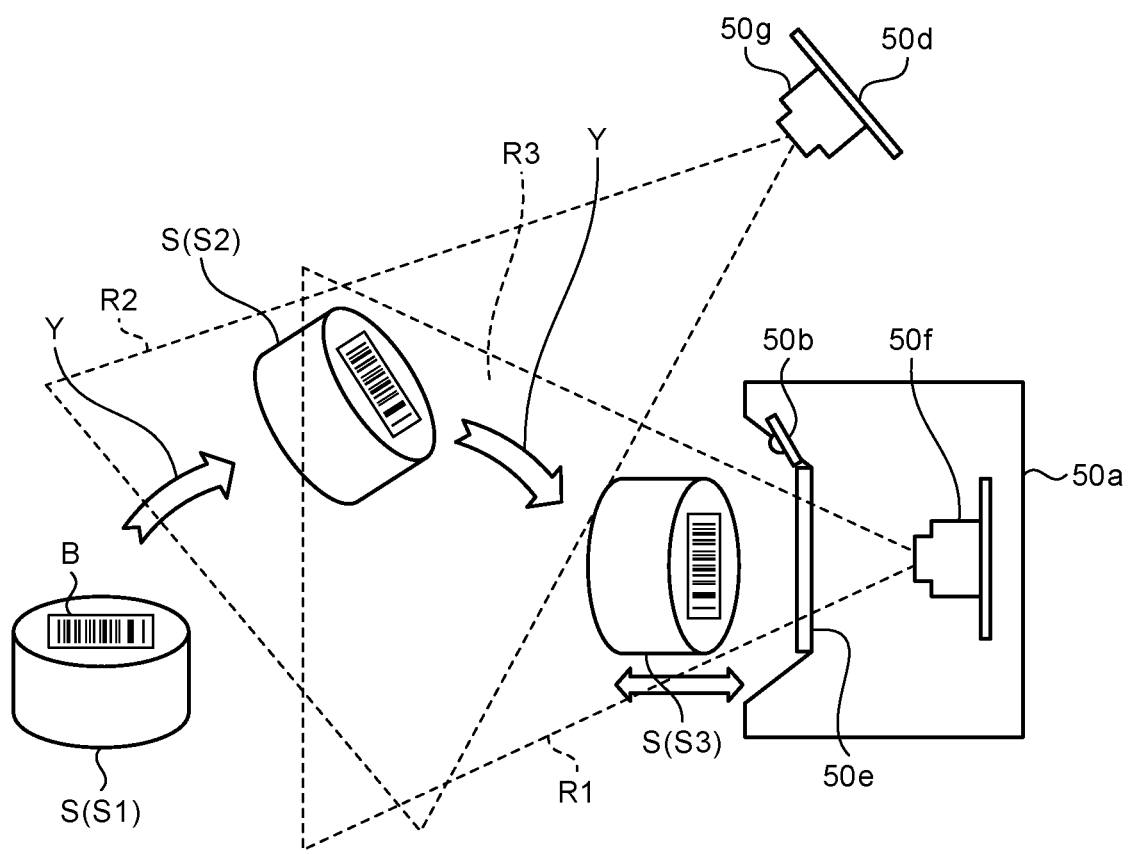
FIG. 2 is an explanatory diagram for explaining reading of a symbol in a payment device.

Next, in the first embodiment, a product registration operation in the payment device 1 performed by the customer will be described. FIG. 2 is an explanatory diagram for explaining imaging of a symbol in the payment device 1. As illustrated in FIG. 2, the first reading unit 50a images a symbol B attached to a product S (product S3) located in a reading region R1 (first reading region) that is a region located substantially on a side of the first reading unit 50a by the camera 50f. In addition, the second reading unit 50d images the symbol B attached to the product S (product S2) located in a reading region R2 (second reading region) that is a region located obliquely below the second reading unit 50d by the camera 50g. The reading region R1 and the reading region R2 partially overlap. Both the first reading unit 50a and the second reading unit 50d can image the symbol B of the product S located in an overlapping region R3. Note that the entire reading region R1 and the entire reading region R2 may overlap each other.

Since the customer is not used to the registration operation of the product S, the customer performs an operation of searching for the symbol B attached to the product S taken out from the basket. At that time, the customer tends to face up the found symbol B. The product S with the symbol B facing upward is a product S1. Since the light emitting unit 50b emits light, the customer then moves the product S1 while gradually tilting it along the arrow Y to bring it closer to the first reading unit 50a. In the process, the product S goes through a state of the product S2 in which the orientation of the symbol B is gradually changing from upward to forward, and then becomes a state of the product S3 in which the symbol B is oriented toward the first reading unit 50a.

When the product S is the product S2, the symbol B is located in the reading region R2 and faces the camera 50g. Therefore, the symbol B of the product S2 can be imaged by the second reading unit 50d. Note that, although the product S2 is also located in the reading region R1, when the symbol B does not face the direction of the camera 50f, the symbol B may not be imaged by the first reading unit 50a.

When the product S is the product S3, the symbol B is located in the reading region R1 and faces the first reading unit 50a. Therefore, the symbol B of the product S3 can be imaged by the first reading unit 50a.

As described above, in the first embodiment, the customer checks the symbol B attached to the product S and performs an operation of holding the symbol B over the first reading unit 50a from which the light emitting unit 50b emits light. Thus, the symbol B is read by either or both of the second reading unit 50d and the first reading unit 50a. Therefore, even if a customer who is not used to the registration operation performs the operation, the symbol B can be reliably read. In addition, since only the light emitting unit 50b emits light, it is sufficient for the customer to hold the symbol B over the first reading unit 50a, and it is possible to prevent the customer from being confused as to which of the first reading unit 50a and the second reading unit 50d the symbol B is held over.

Figure 3:
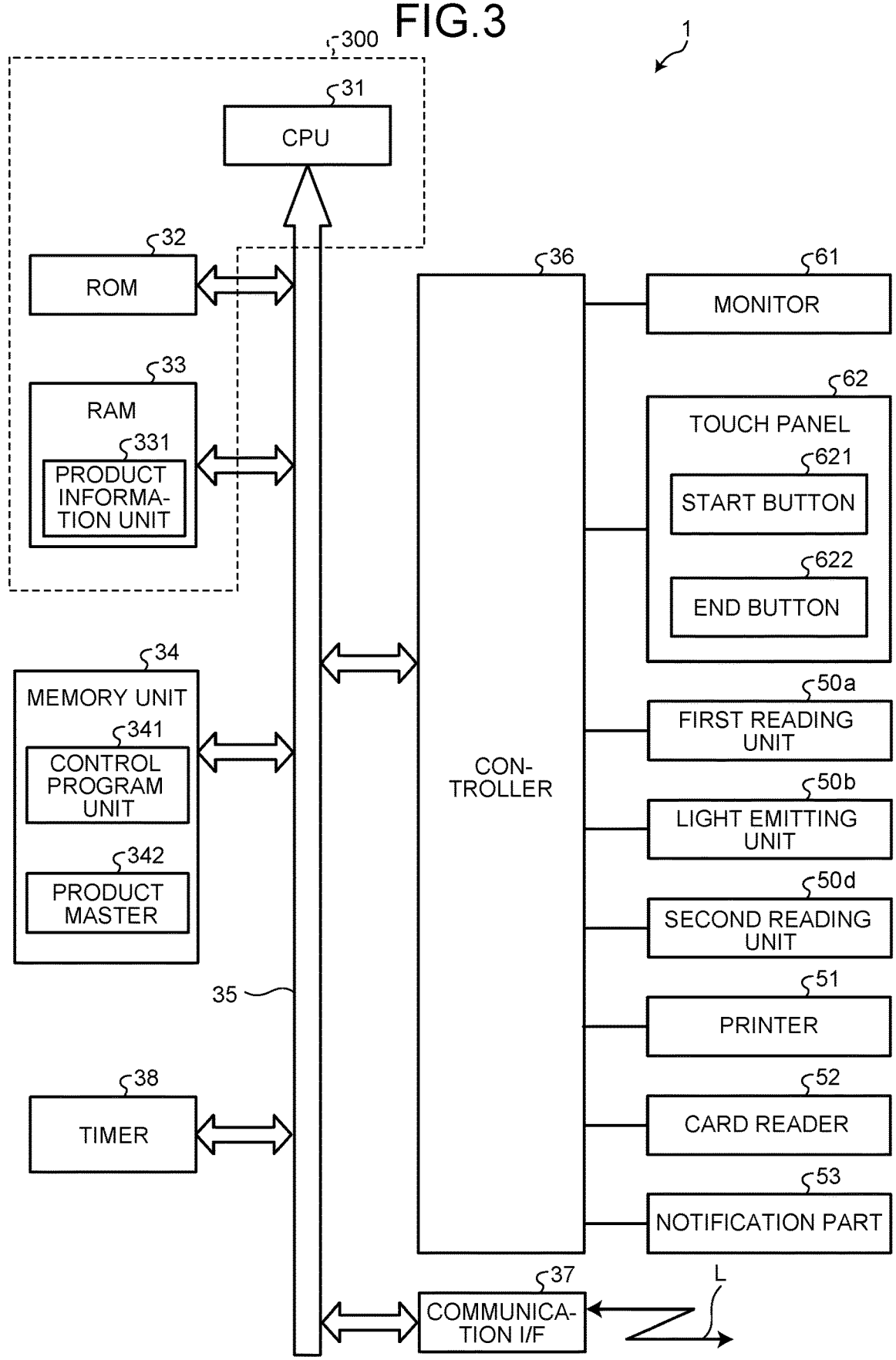
FIG. 3 is a block diagram illustrating a hardware configuration of a payment device of a first embodiment.

Hereinafter, a hardware configuration of the payment device 1 according to the first embodiment will be described. FIG. 3 is a block diagram illustrating a hardware configuration of the payment device 1. As illustrated in FIG. 3, the payment device 1 includes a central processing unit (CPU) 31, a read only memory (ROM) 32, a random access memory (RAM) 33, a memory unit 34, and the like. The CPU 31 is a control subject. The ROM 32 stores various programs. The RAM 33 expands programs and various data. The memory unit 34 stores various programs. The CPU 31, the ROM 32, the RAM 33, and the memory unit 34 are connected to each other via a bus 35. The CPU 31, the ROM 32, and the RAM 33 constitute the control unit 300. That is, the control unit 300 executes control processing of the payment device 1 described later by the CPU 31 operating according to a control program stored in the ROM 32 or the memory unit 34 and expanded in the RAM 33.

The RAM 33 includes a product information unit 331. The product information unit 331 stores the product information acquired based on the product code acquired based on the read symbol B.

The memory unit 34 includes a hard disc drive (HDD), a flash memory, and the like, and maintains the stored contents even when the power is turned off. The memory unit 34 includes a control program unit 341 and a product master 342. The control program unit 341 stores a control program for controlling the payment device 1. The product master 342 stores the product information of the product S for each product code specifying the product S.

The control unit 300 is connected to the monitor 61, the touch panel 62, the first reading unit 50a, the light emitting unit 50b, the second reading unit 50d, the printer 51, the card reader 52, and a notification part 53 via the bus 35 and a controller 36. The monitor 61 includes, for example, a liquid crystal display, and displays product information and the like to a customer who operates the payment device 1. The touch panel 62 is a touch keyboard provided on the monitor 61, including a start button 621 and an end button 622. The start button 621 is operated by the customer when the registration operation by the payment device 1 is started. The end button 622 is operated by the customer when the registration operation by the payment device 1 is ended and the process moves on to the payment operation. The printer 51 prints product information and payment information and issues a receipt. The card reader 52 is used when a payment is made with a credit card, electronic money, and the like.

In addition, the control unit 300 is connected to a communication interface (I/F) 37 via the bus 35. The communication interface 37 is connected to a store server (not illustrated) installed in a store via a communication line L to transmit and receive information. In addition, the control unit 300 connects a timer 38 that measures time via the bus 35. The notification part 53 issues a notification that the symbol has been read. Specifically, the notification part 53 notifies the customer who operates the payment device 1 that the first reading unit 50a or the second reading unit 50d has read the symbol by using voice, light, and the like.

Figure 4:
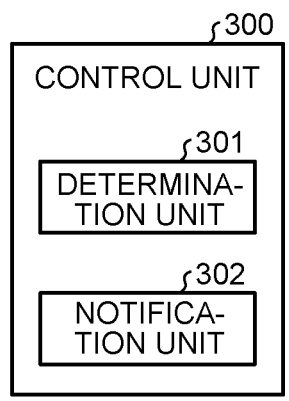
FIG. 4 is a functional block diagram illustrating a functional configuration of the payment device.

Hereinafter, a functional configuration of the payment device 1 according to the first embodiment will be described. FIG. 4 is a functional block diagram illustrating a functional configuration of the payment device 1. The control unit 300 functions as a determination unit 301 and a notification unit 302 according to a control program stored in the ROM 32 or the memory unit 34 and expanded in the RAM 33.

When the second reading unit 50d reads a symbol attached to a product, the determination unit 301 determines whether the first reading unit 50a has read the product within a predetermined time.

When the first reading unit 50a has read a symbol, the notification unit 302 issues a notification from the notification part 53 that the symbol has been read, and when the determination unit 301 determines that the first reading unit 50a has not read the product within a predetermined time, the notification part 53 issues a notification that the symbol has been read after a lapse of the predetermined time.

In addition, when the determination unit 301 determines that the first reading unit 50a has read the product within a predetermined time, the notification unit 302 drives the notification part 53 to issue a notification that the symbol has been read without waiting for the elapse of the predetermined time. Specifically, when the determination unit 301 determines that the first reading unit 50a has read the product within a predetermined time, the notification unit 302 drives the notification part 53 to output a notification indicating that the symbol has been read with light, display, voice, and the like without waiting for the elapse of the predetermined time.

Figure 5:
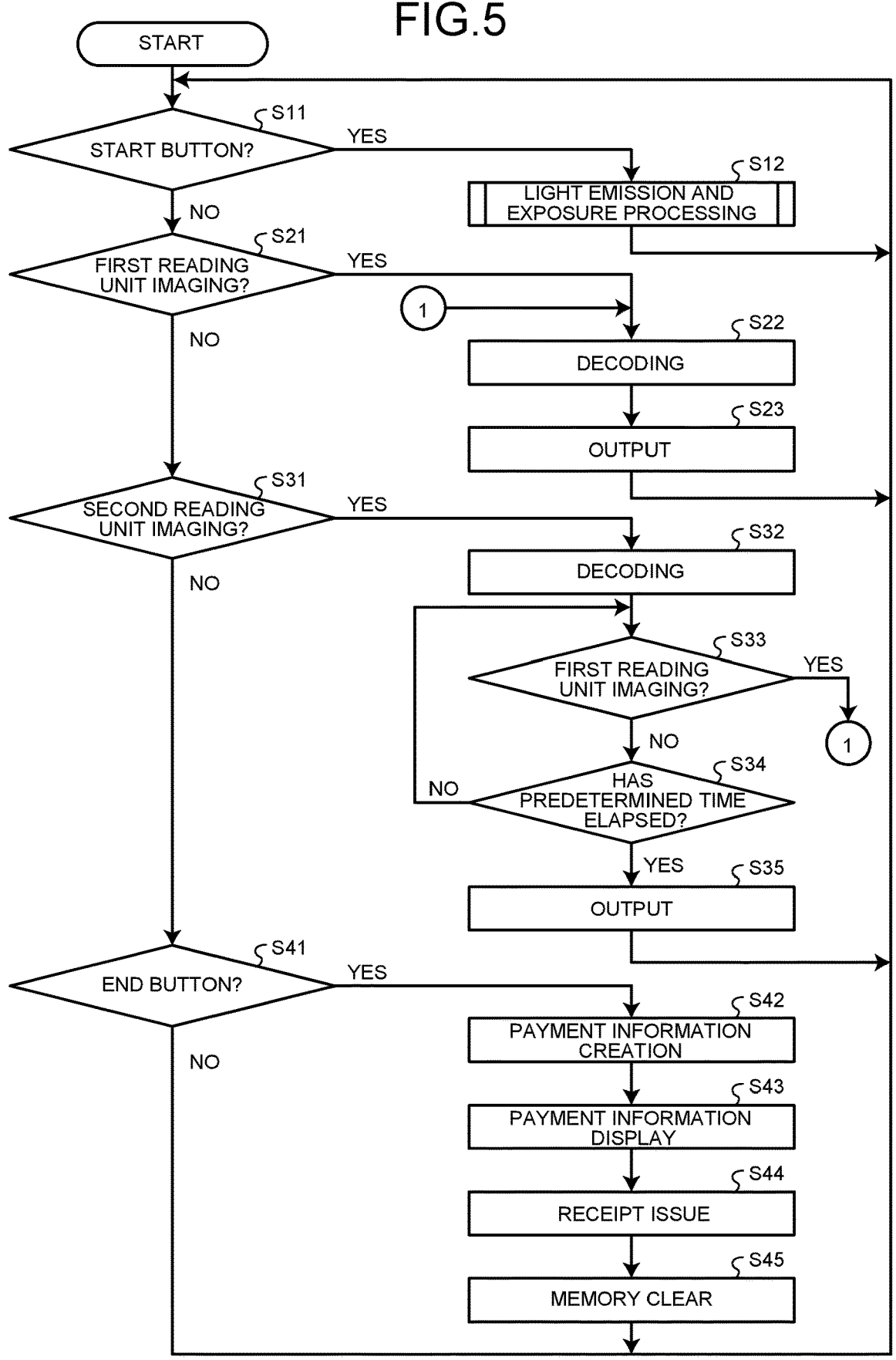
FIG. 5 is a flowchart illustrating control processing of the payment device.

Hereinafter, the control of the payment device 1 will be described. FIG. 5 is a flowchart illustrating control processing of the payment device 1. As illustrated in FIG. 5, the control unit 300 of the payment device 1 determines whether the start button 621 has been operated (S11). When it is determined that the start button 621 has been operated (Yes in S11), the control unit 300 performs light emission processing of the light emitting unit 50b and exposure processing of the first reading unit 50a and the second reading unit 50d (S12). Then, the control unit 300 returns to S11.

Figure 6:
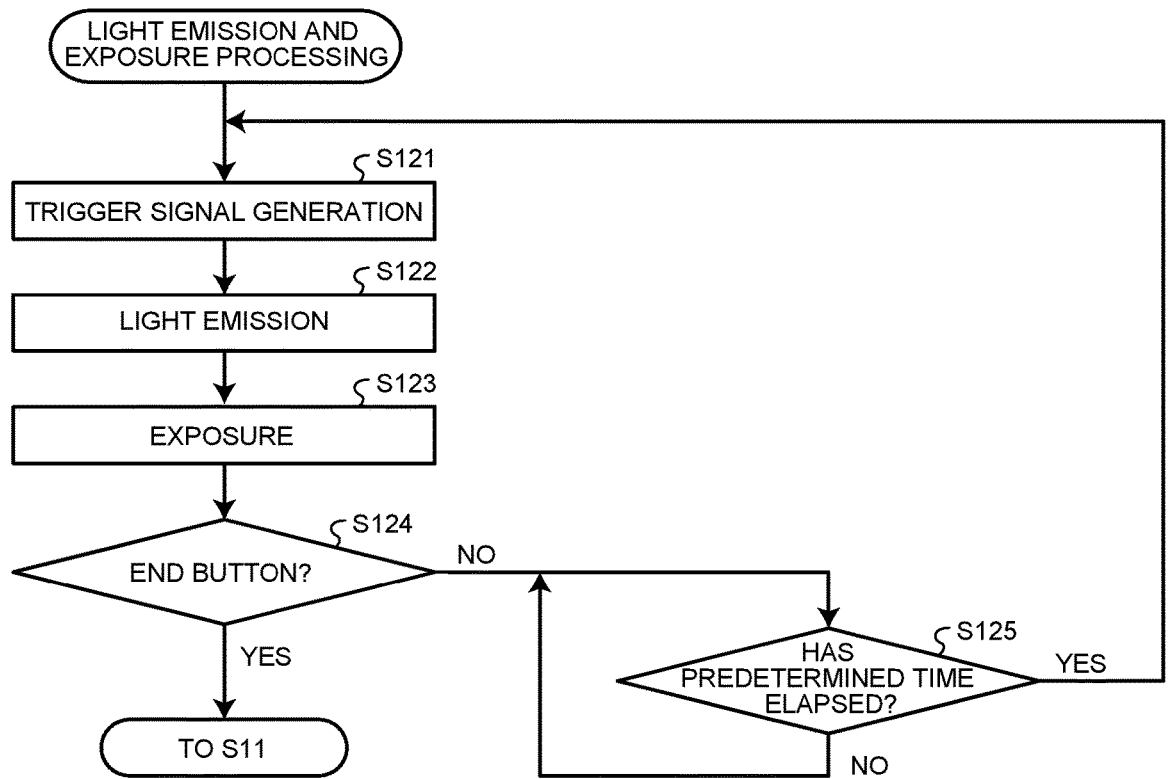
FIG. 6 is a flowchart illustrating control processing of a part of the payment device.

Here, the processing of S12 will be described. FIG. 6 is a flowchart illustrating processing of S12. As illustrated in FIG. 6, the control unit 300 generates a trigger signal (S121). Next, the control unit 300 causes the light emitting unit 50b to emit light for a certain period of time in synchronization with the generated trigger signal (S122). The control unit 300 exposes the first reading unit 50a to light for a first predetermined time simultaneously with light emission of the light emitting unit 50b (S123). In addition, when the product S to which the symbol B is attached is located in the reading region R1, the control unit 300 causes the first reading unit 50a to image the symbol B in S123. In addition, the control unit 300 exposes the second reading unit 50d to light for a second predetermined time simultaneously with light emission of the light emitting unit 50b (S123). When the product S to which the symbol B is attached is located in the reading region R2, the control unit 300 causes the second reading unit 50d to image the symbol B in S123. Note that the first predetermined time is shorter than the second predetermined time.

Next, the control unit 300 determines whether the end button 622 has been operated (S124). When it is determined that the end button 622 has been operated (Yes in S124), the control unit 300 returns to S11. On the other hand, when it is determined that the end button 622 is not operated (No in S124), the control unit 300 determines whether a predetermined time has elapsed since the trigger signal was generated in S121 (S125). When the process waits until the predetermined time elapses (No in S125) and when it is determined that the predetermined time has elapsed (Yes in S125), the control unit 300 returns to S121 and generates the next trigger signal. That is, when the start button 621 is operated, the control unit 300 generates a trigger signal every predetermined time until the end button 622 is operated, and repeats light emission of the light emitting unit 50*b* and exposure of the first reading unit 50*a* and the second reading unit 50*d* at the timing when the trigger signal is generated.

Figure 7:
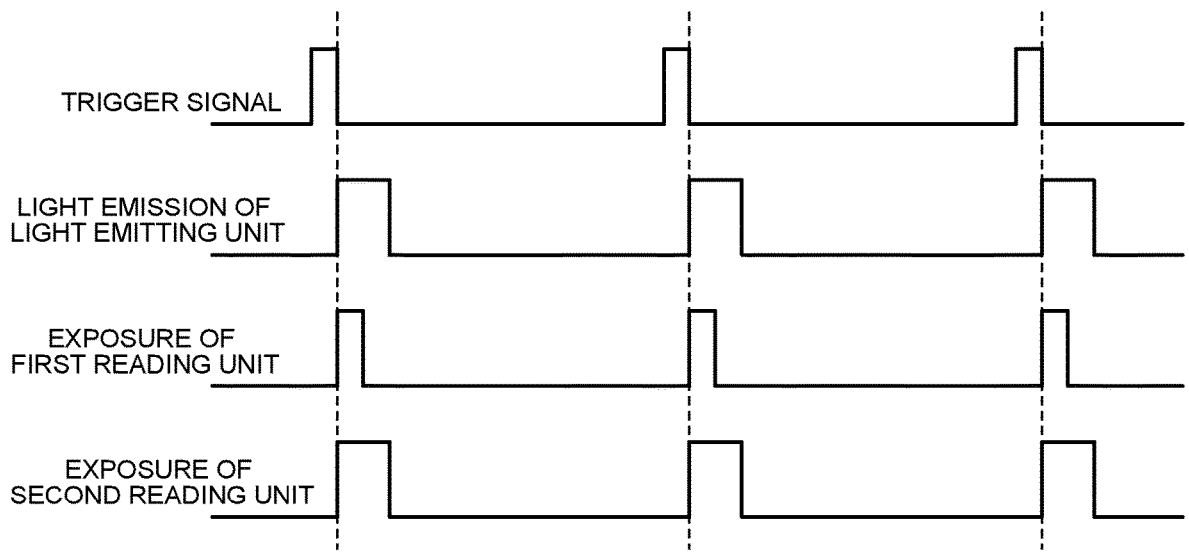
FIG. 7 is a timing chart illustrating light emission timings of a light emitting unit and exposure timings of a first reading unit and a second reading unit.

Here, the generation of the trigger signal in the processing of S121, the light emission of the light emitting unit 50*b*, the light emission timing of the light emitting unit 50*b* in S122, and the exposure timing of the first reading unit 50*a* and the second reading unit 50*d* in S123 will be described. FIG. 7 is a timing chart illustrating light emission timings of the light emitting unit 50*b* and exposure timings of a first reading unit 50*a* and a second reading unit 50*d*. As illustrated in FIG. 7, the trigger signal is generated at predetermined time intervals (for example, every 0.5 ms) when the start button 621 is operated. At the falling timing of the trigger signal, the light emitting unit 50*b* emits light for a second predetermined time. At the same time, the first reading unit 50*a* and the second reading unit 50*d* start exposure. When the first predetermined time elapses after the exposure is started, the first reading unit 50*a* stops the exposure. The first reading unit 50*a* images the symbol B during exposure. When a second predetermined time (the second predetermined time is longer than the first predetermined time) elapses after the exposure is started, the second reading unit 50*d* stops the exposure. The second reading unit 50*d* images the symbol B during exposure. The light emitting unit 50*b*, the first reading unit 50*a*, and the second reading unit 50*d* repeat this operation until the end button 622 is operated.

The description returns to FIG. 5. In addition, when it is determined that the operation is not the operation of the start button 621 (No in S11), the control unit 300 determines whether the first reading unit 50*a* has imaged the symbol B (S21). When the first reading unit 50*a* determines that the symbol B has been imaged (Yes in S21), the control unit 300 performs decoding that is processing of converting the imaged symbol B into a digital value (S22). Then, the notification unit 302 drives the notification part 53 to output a notification that the symbol B has been decoded (S23). Then, the control unit 300 returns to S11. Here, the notification is to notify the customer of the decoding by display, voice, light, and the like.

On the other hand, when it is determined that the imaging is not the imaging of the symbol B by the first reading unit 50*a* (No in S21), the control unit 300 determines whether the second reading unit 50*d* has imaged the symbol B (S31). When the second reading unit 50*d* determines that the symbol B has been imaged (Yes in S31), the control unit 300 decodes the captured symbol B (S32).

Next, the control unit 300 determines whether the symbol B has been imaged by the first reading unit 50*a* (S33). When it is determined that the symbol B has been imaged by the first reading unit 50*a* (Yes in S33), the control unit 300 decodes the symbol B imaged by the first reading unit 50*a* (S22), and outputs a notification of decoding (S23).

On the other hand, when it is determined that the symbol B imaged by the first reading unit 50*a* has not been decoded (No in S33), the determination unit 301 determines whether a predetermined time has elapsed from the processing in S32 (that is, whether the product been read within a predetermined time) based on the time measured by the timer 38 (S34). When the process returns to S33 until a predetermined time elapses (No in S34) and when it is determined that a predetermined time has elapsed (that is, the product is not read within a predetermined time) (Yes in S34), the notification unit 302 drives the notification part 53 and outputs a notification that the symbol B imaged by the second reading unit 50*d* has been decoded without waiting for the elapse of the predetermined time (S35). Then, the control unit 300 returns to S11.

When the determination unit 301 is No in S34, there is a possibility that only the second reading unit 50*d* images the symbol B in the state of the product S2 in FIG. 2. In this state, the customer is still moving the product S to the position of the product S3, and if the notification that the symbol B imaged by the second reading unit 50*d* has been decoded is output at this timing, the notification is performed before the symbol B is imaged by the first reading unit 50*a* (that is, while the customer is still performing the registration operation), and the customer may be confused. Therefore, in S34, by outputting a notification that decoding has been performed after a predetermined time has elapsed (slightly delaying the notification timing), it is possible to output a notification at the timing when the symbol B is imaged by the first reading unit 50*a*, and thus, it is possible to prevent the customer from being confused.

Figure 8:
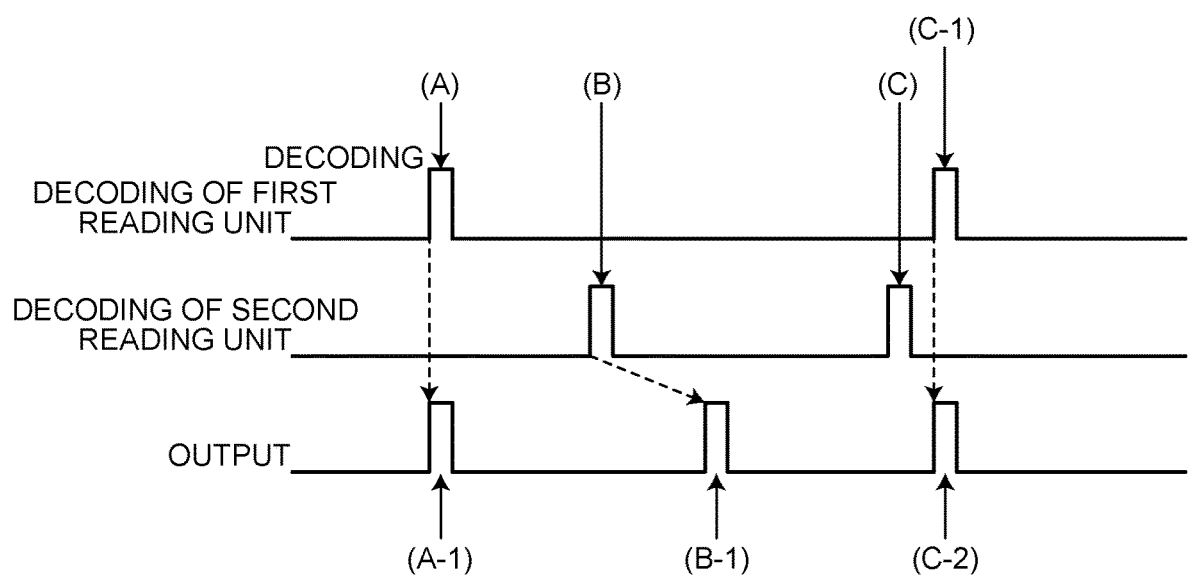
FIG. 8 is a timing chart illustrating decoding and output timings of the first reading unit and the second reading unit.

Here, an output in a case where the symbol B read at each timing in FIG. 5 is decoded will be described. FIG. 8 is a timing chart illustrating decoding and notification output timings of the symbol B imaged by the first reading unit 50*a* and the second reading unit 50*d*. As illustrated in FIG. 8, at timing (A), a state in which the first reading unit 50*a* images and decodes the symbol B is illustrated (state of S22 in FIG. 5). In this case, the notification unit 302 drives the notification part 53 to output a notification that the symbol B has been decoded (A-1, S23 in FIG. 5). In this case, since the notification output is performed at the decoding timing by imaging of the first reading unit 50*a*, the customer is not confused.

In addition, at timing (B), a state in which the second reading unit 50*d* images and decodes the symbol B is illustrated (state of S32 in FIG. 5). In this case, when it is determined that a predetermined time has elapsed (Yes in S34), the notification unit 302 drives the notification part 53 to output a notification that the symbol B has been decoded (B-1). In this case, even in the decoding by the imaging of the second reading unit 50*d*, since the notification output is performed at the timing when the predetermined time has elapsed, the customer is not confused.

In addition, at timing (C), a state in which the second reading unit 50*d* images and decodes the symbol B is illustrated (state of S32 in FIG. 5). Thereafter, before a predetermined time elapses, the first reading unit 50*a* images and decodes the symbol B (Yes in S33) (C-1). In this case, the notification unit 302 drives the notification part 53 to output a notification that the symbol B imaged by the first reading unit 50*a* has been decoded without waiting for the elapse of a predetermined time (C-2). In this case, the control unit 300 does not perform output based on decoding of the symbol B imaged by the second reading unit 50*d* at the timing (C). In this case, since the notification output is performed at the decoding timing by imaging of the first reading unit 50a, the customer is not confused.

The description returns to FIG. 5. On the other hand, when it is determined that the image of the symbol B is not imaged by the second reading unit 50d (No in S31), the control unit 300 determines whether the end button 622 has been operated (S41). When it is determined that the end button 622 has been operated (Yes in S41), the control unit 300 creates the payment information based on the product information stored in the product information unit 331 (S42). That is, the total amount of the current transaction, the change amount when there is change, and the like are created. Then, the control unit 300 displays the created payment information on the monitor 61 (S43). Then, the control unit 300 operates the printer 51 to print the product information and the payment information and issue a receipt (S44). Then, the control unit 300 clears the product information stored in the product information unit 331 (S45). Then, the control unit 300 returns to S11.

As described above, the payment device 1 of the first embodiment includes: a first reading unit 50a that reads a symbol attached to a product; a second reading unit 50d that reads a symbol attached to a product; a notification part 53 that issues a notification that the symbol has been read; a determination unit 301 that determines whether the first reading unit 50a has read a product within a predetermined time when the second reading unit 50d reads a symbol attached to the product; and a notification unit 302 that issues a notification that a symbol has been read from the notification part 53 when the first reading unit 50a has read the symbol, and issues a notification that the symbol has been read from the notification part 53 after a lapse of the predetermined time when the determination unit 301 determines that the first reading unit 50a has not read the product within the predetermined time.

When the second reading unit 50d reads the symbol B, the payment device 1 according to the first embodiment notifies that the symbol B has been imaged after the predetermined time has elapsed. Therefore, it is possible to prevent the operator from being confused by the notification when the first reading unit 50a has imaged the symbol B.

Second Embodiment

Figure 9:
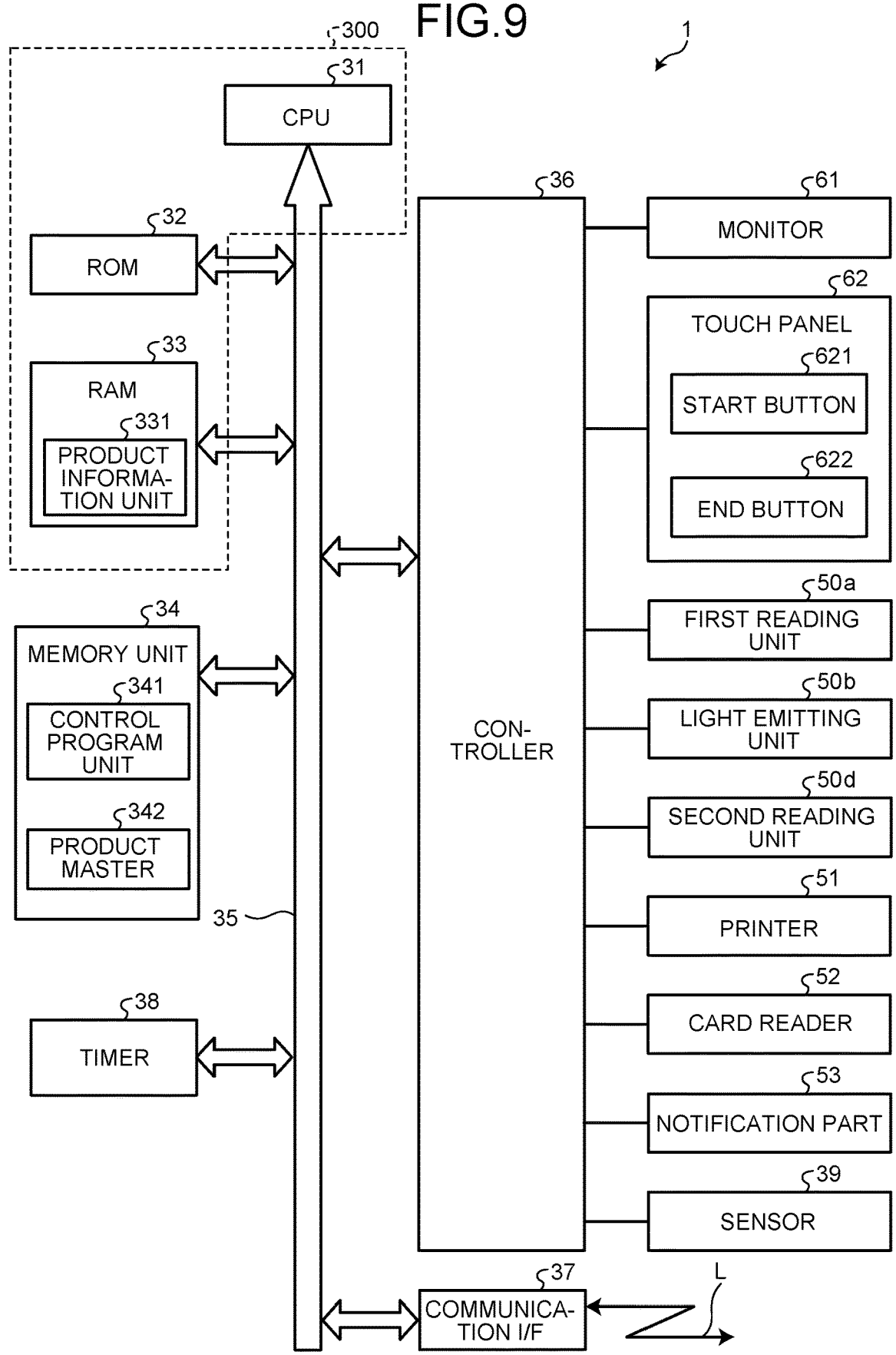
FIG. 9 is a block diagram illustrating a hardware configuration of a payment device of a second embodiment.

Hereinafter, a second embodiment will be described below. In the second embodiment, the same components as those of the first embodiment are denoted by the same reference numerals, and the description will be omitted or simplified. FIG. 9 is a block diagram illustrating a hardware configuration of the payment device 1 of the second embodiment. The payment device 1 illustrated in the block diagram of FIG. 9 has a configuration in which a sensor 39 is added to the payment device 1 illustrated in FIG. 3. The sensor 39 is a sensor that outputs detection that the product S is located in the reading region R1.

Figure 10:
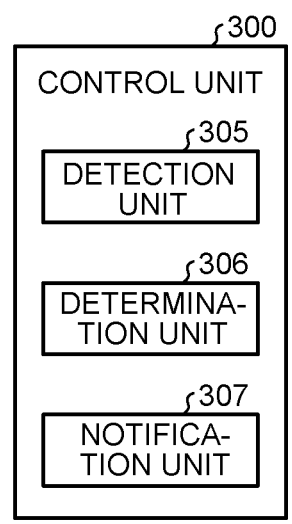
FIG. 10 is a functional block diagram illustrating a functional configuration of the payment device.

Hereinafter, a functional configuration of the payment device 1 according to the second embodiment will be described. FIG. 10 is a functional block diagram illustrating a functional configuration of the payment device 1. The control unit 300 functions as a detection unit 305, a determination unit 306, and a notification unit 307 according to a control program stored in the ROM 32 or the memory unit 34 and expanded in the RAM 33.

The detection unit 305 detects the product S located in the reading region R1. Specifically, the detection unit 305 detects that the product S is located in the reading region R1 based on the output that the sensor 39 has detected the product S.

When the second reading unit 50d reads a symbol attached to a product located outside the first reading region R1, the determination unit 306 determines whether the detection unit 305 has detected the product within a predetermined time.

When the first reading unit 50a has read a symbol, the notification unit 307 issues a notification from the notification part 53 that the symbol has been read, and when the determination unit 306 determines that the product has been detected within a predetermined time, the notification part 53 issues a notification that the symbol has been read after a lapse of the predetermined time.

When the determination unit 306 determines that the product is not detected within a predetermined time, the notification unit 307 does not issue a notification that the symbol has been read.

Hereinafter, control of the payment device 1 according to the second embodiment will be described. When it is determined that the operation is not the operation of the start button 621 in S11 (No in S11), the detection unit 305 determines whether the product S is located in the reading region R1 (S51). When it is determined that the product S is located in the reading region R1 (Yes in S51), the control unit 300 executes the processing of S21 to S23. That is, the notification unit 307 drives the notification part 53 to output a notification that the symbol B has been decoded in S22 (S23).

When it is determined that the product S is not located in the reading region R1 (No in S51), the control unit 300 performs the determination in S31 and the processing in S32. Next, the detection unit 305 determines whether the product S is located in the reading region R1 based on the output from the sensor 39 (S61). When it is determined that the product S is located in the reading region R1 (Yes in S61), the notification unit 307 drives the notification part 53 to output a notification that the symbol B has been decoded in S32 (S62). On the other hand, when it is determined that the product S is not located in the reading region R1 (No in S61), it is determined whether a predetermined time has elapsed from the processing in S32 based on the time measured by the timer 38 (S63). The process returns to S61 and waits until a predetermined time elapses (No in S63). When it is determined that a predetermined time has elapsed without the product S being located in the reading region R1 (Yes in S63), the notification unit 307 clears the notification indicating decoding in S32 without outputting the notification from the notification part 53 (S64). Then, the control unit 300 returns to S11.

Figure 11:
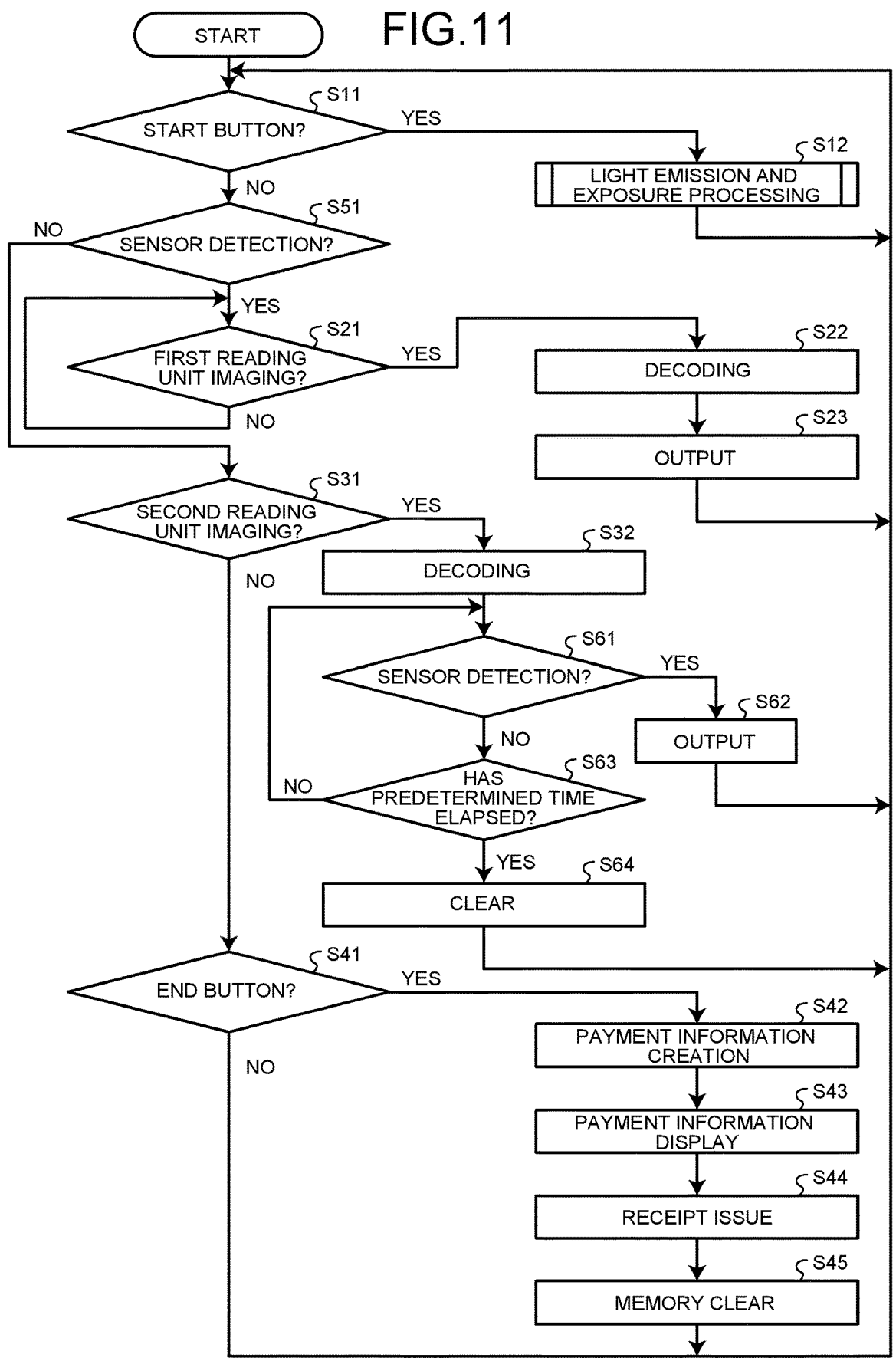
FIG. 11 is a flowchart illustrating control processing of the payment device.
Figure 12:
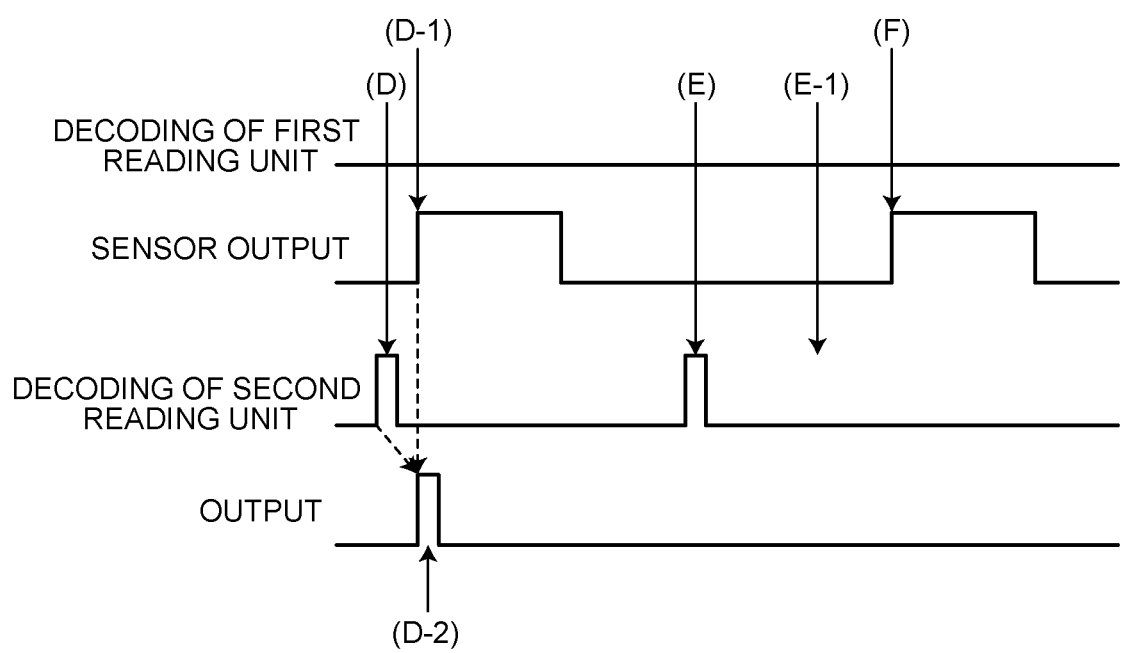
FIG. 12 is a timing chart illustrating decoding and output timings of the second reading unit.

Here, an output in a case where the symbol B read at each timing in FIG. 11 is decoded will be described. FIG. 12 is a timing chart illustrating decoding and output timings of the second reading unit 50d. As illustrated in FIG. 12, at timing (D), a state in which the second reading unit 50d images and decodes the symbol B is illustrated (state of S32 in FIG. 11). In this case, the notification unit 307 outputs a notification that the symbol B imaged by the second reading unit 50d has been decoded at the timing when the sensor 39 detects the product S (D-1). In this case, since the notification output indicates that the product S is decoded at the timing when the product S enters the reading region R1, the customer is not confused.

In addition, at timing (E), a state in which the second reading unit 50d images and decodes the symbol B is illustrated (state of S32 in FIG. 5). In this case, the control unit 300 does not issue a notification that the symbol B has been decoded at the timing (E-1) when it is determined that a predetermined time has elapsed without the product S entering the reading region R1 (Yes in step S63) (step S64). Therefore, the customer is not confused. In FIG. 12, in a state (F) detected by the sensor 39 after a lapse of a predetermined time after the timing (E-1), it is considered that the customer detects, for example, a hand of the customer by an operation different from the registration operation of the product S. Therefore, in the second embodiment, a notification output indicating decoding is not performed at timing (F). In FIG. 12, the first reading unit 50a does not detect the product S.

As described above, the payment device 1 of the second embodiment includes: a detection unit 305 that detects a product located in a first reading region R1; a first reading unit 50a that reads a symbol attached to a product; a second reading unit 50d that reads a symbol attached to a product; a notification part 53 that issues a notification that the symbol has been read; a determination unit 306 that determines whether the detection unit 305 detected a product within a predetermined time when the second reading unit 50d reads a symbol attached to the product that is located outside the first reading region R1; and a notification unit 307 that issues a notification that the first reading unit 50a has read a symbol from the notification part 53 when the first reading unit 50a has read the symbol, and issues a notification that the symbol has been read from the notification part 53 after a lapse of the predetermined time when the determination unit 306 determines that the product has been detected within the predetermined time.

The payment device 1 of the second embodiment issues a notification that the symbol B has been imaged when the product S is located in the reading region R1 before a predetermined time elapses after the symbol B is imaged by the second reading unit 50d. When the product S is located in the reading region R1, since it is the timing at which the symbol B is imaged by the first reading unit 50a, it is possible to prevent the operator from being confused by the notification at the time of reading the symbol B.

Although the embodiments of the present invention have been described above, these embodiments have been presented as examples, and are not intended to limit the scope of the invention. These embodiments can be implemented in various other forms, and various omissions, substitutions, changes, and combinations can be made without departing from the gist of the invention. These embodiments and modifications are included in the scope and gist of the invention, and are included in the invention described in the claims and the equivalent scope.

For example, in the embodiment, the first reading unit 50a and the second reading unit 50d image the symbol B using a camera. However, the present invention is not limited to this, and the first reading unit 50a and the second reading unit 50d may be devices that optically read the symbol B.

In the embodiment, the payment device 1 has been described as one component of the self checkout device 100. However, the present invention is not limited to this, and the payment device 1 may be a component of a normal checkout device operated by a store clerk and the like instead of the customer.

What is claimed is:

1. A payment device comprising:
a first reading unit having a first reading region to read a symbol attached to a product, and directed in a first direction toward an operator position in front of the payment device;
a second reading unit having a second reading region to read the symbol, provided above the first reading unit, and directed in a second direction that is obliquely downward toward the operator position, wherein
    the second reading region partially overlaps with the first reading region and extends closer to the operator position than the first reading region, and
    the second reading unit is positioned and directed such that the product enters the second reading region before the first reading region when the product is moved from the operator's position toward the first reading unit;
a notification part; and
a controller, wherein
the controller determines whether the first reading unit has read a symbol within a predetermined period of time when the second reading unit reads a symbol,
the controller causes the notification part to issue a notification that a symbol has been read when determining that the first reading unit has read the symbol, and
the controller causes the notification part to issue a notification that a symbol has been read after a lapse of the predetermined period of time when determining that the first reading unit has not read the symbol within the predetermined period of time.

2. The payment device according to claim 1, wherein when determining that the first reading unit has read the symbol within the predetermined period of time, the controller causes the notification part to issue a notification that a symbol has been read without waiting for a lapse of the predetermined period of time.

3. A payment device comprising:
a first reading unit having a first reading region to read a symbol attached to a product, and directed in a first direction toward an operator position in front of the payment device;
a second reading unit having a second reading region to read the symbol, provided above the first reading unit, and directed in a second direction that is obliquely downward toward the operator position, wherein
    the second reading region partially overlaps with the first reading region and extends closer to the operator position than the first reading region, and
    the second reading unit is positioned and directed such that the product enters the second reading region before the first reading region when the product is moved from the operator's position toward the first reading unit;
a detection unit that detects a product located in the first reading region;
a notification part; and
a controller, wherein
the controller determines whether the detection unit detected the product within a predetermined time when the second reading unit reads a symbol attached to a product that is located in the second reading region,
the controller causes the notification part to issue a notification that a symbol has been read when the first reading unit has read a symbol, and
the controller causes the notification part to issue a notification that a symbol has been read after a lapse of the predetermined time when determining that the detection unit has detected the product within the predetermined time.

4. The payment device according to claim 3, wherein the controller does not cause the notification part to issue any notification that a symbol has been read when determining that the detection unit has not detected the product within the predetermined time.

\* \* \* \* \*